United States Patent [19]

Nakayama

[11] Patent Number: 4,700,204

[45] Date of Patent: Oct. 13, 1987

[54] INK DOT PRINTER WITH SELECTIVE ENERGIZATION OF BOTH ELECTRODES

[75] Inventor: Tetsuroh Nakayama, Mishima, Japan

[73] Assignee: Tokyo Electric Co., Ltd., Tokyo, Japan

[21] Appl. No.: 848,575

[22] Filed: Apr. 7, 1986

[30] Foreign Application Priority Data

Apr. 12, 1985 [JP] Japan ............ 60-77867

[51] Int. Cl.[4] ............ G01D 15/16

[52] U.S. Cl. ............ 346/140 R

[58] Field of Search ............ 346/140, 75, 1.1

[56] References Cited

U.S. PATENT DOCUMENTS

| | | | |
|---|---|---|---|
| 3,060,429 | 10/1962 | Winston | 346/1.1 |
| 4,153,467 | 5/1979 | Yano | 346/1.1 X |
| 4,571,597 | 2/1986 | Kocot | 346/75 |
| 4,603,338 | 7/1986 | Nakayama | 346/140 |

FOREIGN PATENT DOCUMENTS 757268 4/1967 Canada .

*Primary Examiner*—Joseph W. Hartary
*Attorney, Agent, or Firm*—Oblon, Fisher, Spivak, McClelland & Maier

[57] ABSTRACT

A recording electrode and an opposed electrode are so positioned as to confront each other through a recording medium, and a recording signal is applied to the recording electrode while a signal reverse-biased with respect to the recording signal is applied to the opposed electrode, so that the potential difference between the recording electrode and the opposed electrode is increased in a state where the respective voltages applied to the mutually confronting electrodes are maintained at low values, thereby sputtering ink from the fore end of the recording electrode in a satisfactory manner without the necessity of any particular process for insulation of the individual components.

16 Claims, 9 Drawing Figures

INK DOT PRINTER WITH SELECTIVE ENERGIZATION OF BOTH ELECTRODES

FIELD OF THE INVENTION AND RELATED ART STATEMENT

The present invention relates to a dot printer designed to perform printing by aggregating a multiplicity of dots on a recording medium and, more particularly, to an ink dot printer which sputters ink by the application of electrostatic force.

There has been known heretofore an ink dot printer of a type which supplies ink to the fore end of a recording electrode and sputters the ink therefrom by electrostatic force. In the basic structure of such ink dot printer, a recording electrode and an opposed electrode are so positioned as to confront each other through a recording paper, and a voltage applying means is connected to generate a potential difference between the recording electrode and the opposed electrode. And ink supplied to the fore end of the recording electrode is sputtered toward the recording paper electrostatically by the potential difference induced between the recording electrode and the opposed electrode.

In the method of energization by such voltage applying means, the requisite for sputtering the ink electrostatically is met if the relative voltage between the recording electrode and the opposed electrode exceeds a predetermined value. It is therefore customary in the conventional apparatus to apply to either the recording electrode or the opposed electrode a voltage corresponding to a printing signal.

In such prior art, however, there exists the following problem. Since application of the voltage in accordance with a printing signal is effected merely to one of the recording electrode and the opposed electrode, the absolute value of the voltage becomes high against the ground regardless of whether the voltage is positive or negative, so that it is rendered difficult to maintain proper insulation among the individual components. From the reverse point of view, complete safety is not achievable in case a sufficiently high voltage is applied to the recording electrode or the opposed electrode for sputtering the ink.

OBJECTS AND SUMMARY OF THE INVENTION

It is a first object of the present invention to provide an ink dot printer capable of sputtering ink in a satisfactory manner from the fore end of a recording electrode.

A second object of the invention resides in providing an ink dot printer where complete insulation can be maintained with facility for individual components.

And a third object of the invention is to provide an ink dot printer adapted to perform high-quality printing.

In order to accomplish the objects mentioned above, the present invention is so contrived that a recording signal corresponding to a printing signal is applied to a recording electrode, and simultaneously a signal reverse-biased with respect to the recording signal is applied to an opposed electrode, whereby the potential difference between the recording electrode and the opposed electrode can be increased while the respective voltages applied to the two electrodes are retained at low values against the ground. Consequently it becomes possible to sputter the ink in a satisfactory manner from the fore end of the recording electrode by applying a sufficiently high voltage required for such sputtering. And due to the low absolute value of each applied voltage against the ground, any particular process for keeping an insulated state is not needed to eventually facilitate the step for ensuring desired insulation.

DETAILED DESCRIPTION OF PREFERRED EMBODIMENTS

Figure 1:
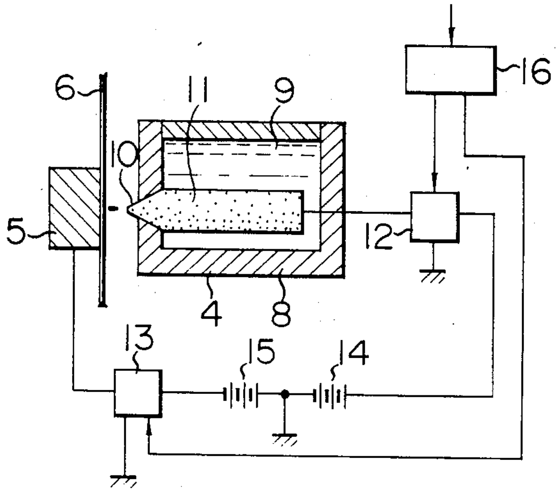
FIG. 1 is a vertical sectional side view of a first embodiment of the present invention.
Figure 2:
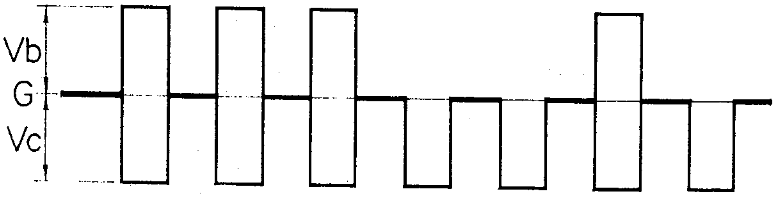
FIG. 2 is a waveform chart showing how voltages are applied in the embodiment of FIG. 1.
Figure 3:
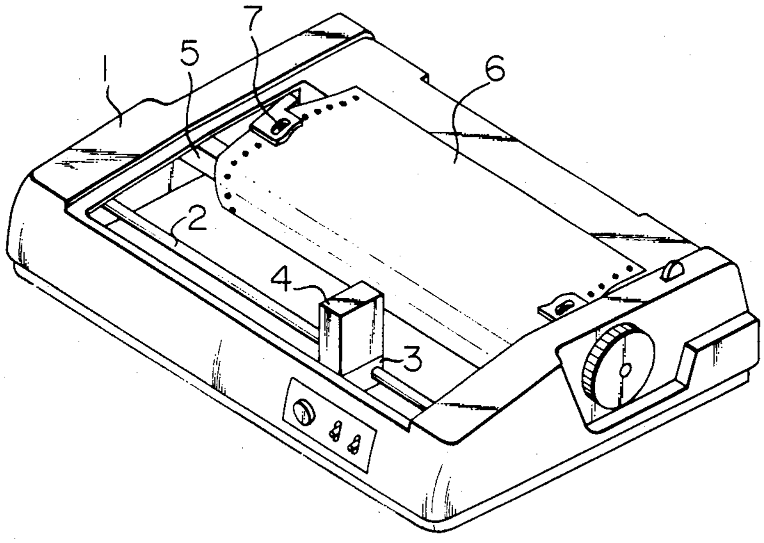
FIG. 3 is a general perspective view of a printer.

Hereinafter a first exemplary embodiment of the present invention will be described with reference to FIGS. 1 through 3. A guide shaft 2 is disposed horizontally in a printer body 1, and a carrier 3 is mounted on the guide shaft 2 reciprocably. A printer head 4 is supported in the carrier 3 and, at the center of the printer body 1, an opposed electrode 5 is positioned in parallel with the guide shaft 2. And between the opposed electrode 5 and the printer head 4, there is disposed a recording paper 6 which is fed as a recording medium while being driven by tractors 7 located on two sides of the printer body 1.

The printer head 4 is equipped with a housing case 8 containing ink 9 therein, and a recording electrode 11 is set in the case 8 with its fore end 10 projecting from the case 8. The recording electrode 11 is conductive and has ink-impregnation property so that the ink 9 is continuously introduced to its fore end 10. Although merely a single recording electrode 11 is shown, a plurality of such electrodes are juxtaposed in an actual arrangement.

The recording electrode 11 is connected to a high voltage switch 12, while the opposed electrode 5 is connected to another high voltage switch 13. The respective on-terminals of such high voltage switches 12 and 13 are connected to each other through two power sources 14 and 15, while the off-terminals thereof are grounded, and a midpoint of connection between the power sources 14 and 15 is also grounded. And a printing control circuit 16 for producing a control signal in accordance with a printing signal is connected to the high voltage switches 12 and 13.

In the above structure, the actions of displacing the carrier 3, feeding the recording paper 6 and producing a printing signal are executed synchronously with one another.

In a printing operation performed under the condition mentioned, voltages are applied to the recording electrode 11 and the opposed electrode 5. To the recording electrode 11 is applied a recording signal of a voltage Vb corresponding to an output signal of the print control circuit 16. Meanwhile, to the opposed electrode 5 is applied a signal of a voltage Vc which is a reverse bias with respect to the recording signal. In FIG. 3, any waveform portion without the recording signal Vb represents a region where a dot need not be formed. In contrast therewith, application of the signal Vc to the opposed electrode 5 is executed periodically so as to always comply with the recording signal Vb which may be inputted to some of the recording electrodes 11 at any time.

As a result of applying such signals in the manner mentioned above, although the absolute value of the voltage against the ground is Vb or Vc, the potential difference between the recording electrode 11 and the opposed electrode 5 becomes (Vb +Vc) which is sufficiently high to sputter the ink 9. Thus the ink 9 at the fore end 10 of the recording electrode 11 is subjected to adequate electrostatic force and is thereby sputtered with certainty to effect satisfactory printing. And further due to the low absolute value of the voltage against the ground, the withstand voltage requirement of each circuit need not be so high to eventually facilitate the means for maintaining necessary insulation among the components. In addition, the recording electrode 11 and the opposed electrode 5 are grounded during the absence of a printing signal so that complete safety is retained.

Meanwhile the ink 9 selectively employed has a conductivity of 10 $A^7$ to 10 $A^9$ (s/cm), a small surface tension and a low viscosity which is below 10 cp (centipoise). With regard to the conductivity, if its value is higher than 10 $A^7$ (s/cm), induction occurs between the electrodes to bring about a failure in generating a required potential difference and thereby eliminates the selectivity in sputtering the ink. Furthermore, the sputtered ink is turned to be misty so that stable printing is not attainable. To the contrary, when the conductivity is lower than 10 $A^9$ (s/cm), the charge transition to the ink meniscus is rendered smaller to reduce the response speed or is interrupted to fail in sputtering the ink. It is therefore desired that the conductivity be maintained within the above-mentioned range.

Figure 4:
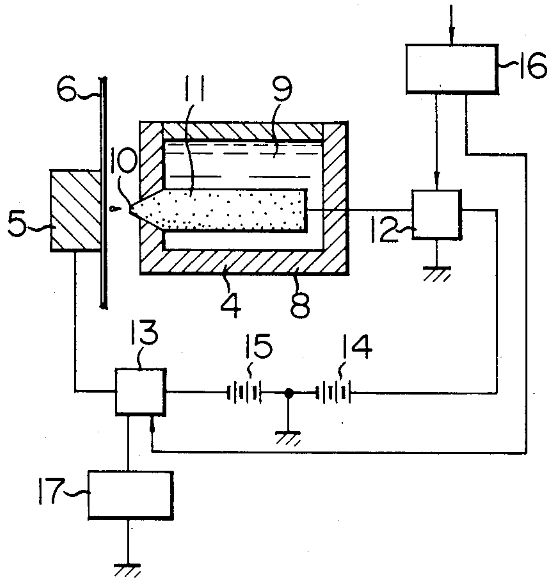
FIG. 4 is a vertical sectional side view of a second embodiment of the invention.
Figure 5:
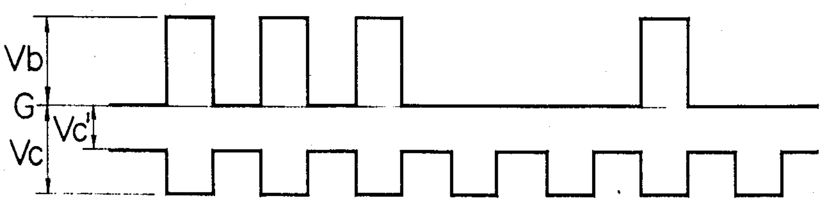
FIG. 5 is a waveform chart showing how voltages are applied in the embodiment of FIG. 4.

Now a second exemplary embodiment of the present invention will be described with reference to FIGS. 4 and 5, wherein components identical with those used in the foregoing first embodiment are denoted by like reference numerals, and a repeated explanation is omitted here. (This applies also to the next and following embodiments.) In this example, a bias source 17 is connected to a high voltage switch 13 for an opposed electrode 5. Then, as shown in FIG. 5, a bias voltage Vc' from the bias source 17 is applied continuously to the opposed electrode 5 despite the absence of a recording signal, thereby generating a potential difference between the opposed electrode 5 and the recording electrode 11. Consequently, even in the absence of a printing signal, the ink 9 is concentrated on the fore end 10 of the recording electrode 11 and is thereby rendered readily sputterable in response to arrival of a printing signal. As a result, smooth sputter of the ink 9 is attained with its amount kept uniform to eventually enhance the printing quality. It is a matter of course that the bias voltage Vc' is of a value insufficient to sputter the ink 9.

Figure 6:
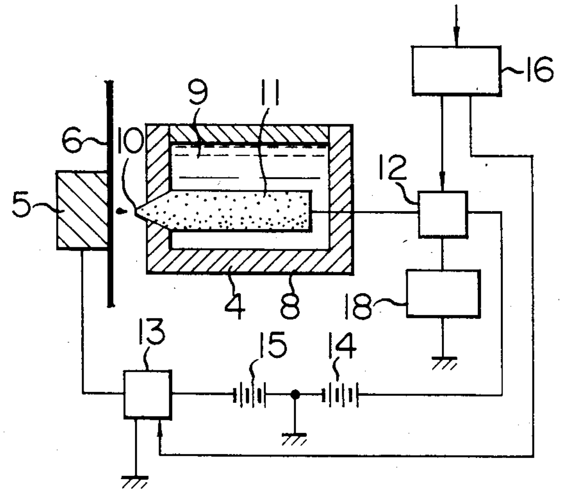
FIG. 6 is a vertical sectional side view of a third embodiment of the invention.
Figure 7:
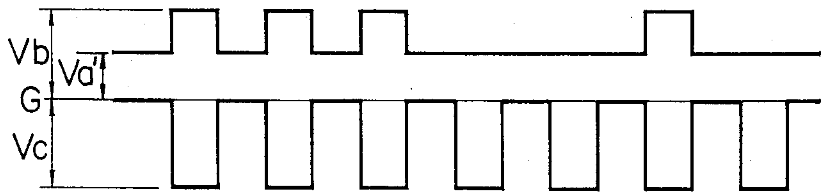
FIG. 7 is a waveform chart showing how voltages are applied in the embodiment of FIG. 6.

In a third embodiment of the present invention shown in FIGS. 6 and 7, a bias source 18 is connected to a recording electrode 11. Therefore, as shown in FIG. 7, a bias voltage Va' is applied continuously to the recording electrode 11 despite the absence of a printing signal. Thus, the effect of concentrating the ink 9 on the fore end 10 of the recording electrode 11 is achievable by the bias voltage Va' as in the foregoing example.

Figure 8:
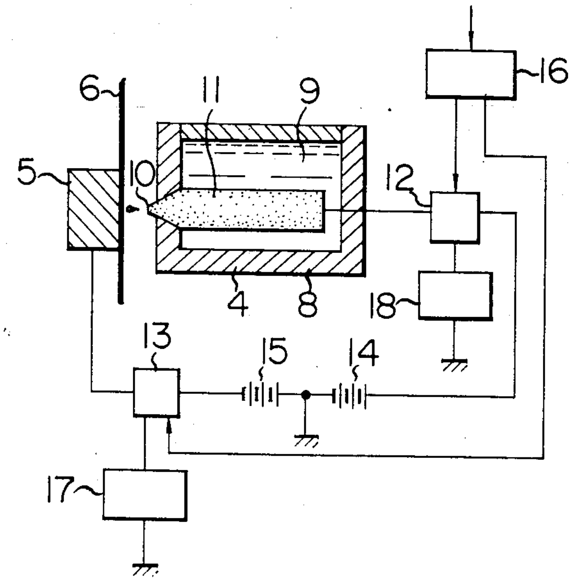
FIG. 8 is a vertical sectional side view of a fourth embodiment of the invention.
Figure 9:
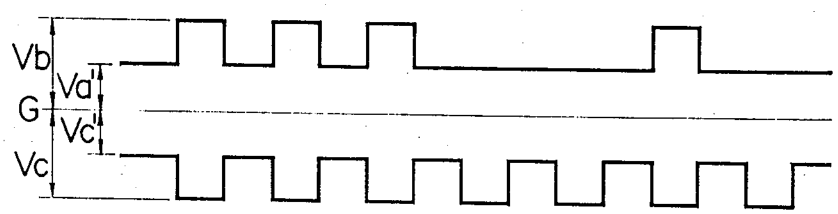
FIG. 9 is a waveform chart showing how voltages are applied in the embodiment of FIG. 8.

FIGS. 8 and 9 show a fourth embodiment of the present invention, wherein bias sources 17 and 18 are connected respectively to an opposed electrode 5 and a recording electrode 11. In this configuration, as shown in FIG. 9, a bias voltage (Va'+Vc') is applied continuously despite the absence of a printing signal.

What is claimed is:

1. An ink dot printer comprising:
- an opposed electrode;
- a recording electrode supplied with ink at the fore end thereof and positioned so as to confront the opposed electrode through a recording medium;
- an electric field being generated between said recording electrode and said opposed electrode to support the ink electrostatically from the fore end of said recording electrode toward said recording medium;
- a voltage source;
- a first switching means connected between said voltage source and said recording electrode;
- a second switching means connected between said voltage source and said opposed electrode;
- recording control means connected to said first and second switching means;
- said first switching means being controlled by a first signal from said recording control means to switch from a first voltage to second voltage when a dot is to be printed;
- said second switch means being controlled by a second signal from said recording control means to switch from a third voltage to a fourth voltage which is reverse-biased with respect to said second voltage at each possible dot location regardless of whether a first signal is present;
- said first signal and said second signal being of equal duration and occurring in phase so that said electric field is equal to the sum of said second voltage, and said fourth voltage when a dot is to be printed.

2. The ink dot printer as defined in claim 1, wherein the conductivity of said ink is within a range of 10 $A^7$ to 10 $A^9$ (s/cm).

3. The ink dot printer as defined in claim 1, wherein said electric field is equal to the sum of said first voltage and said third voltage when a dot is not printed at a possible dot location.

4. The ink dot printer as defined in claim 1, wherein said first voltage is ground.

5. The ink dot printer as defined in claim 1, wherein said third voltage is ground.

6. The dot printer as defined in claim 1, wherein said first and third voltages are ground.

7. The ink dot printer as defined in claim 1, wherein said first voltage is not ground.

8. The ink dot printer as defined in claim 1, wherein said third voltage is not ground.

9. The dot printer as defined in claim 1, wherein said first and third voltages are not ground.

10. An ink dot printer comprising;
- an opposed electrode;
- a recording electrode supplied with ink at the fore end thereof and positioned so as to confront the opposed electrode through a recording medium;
- an electric field being generated between said recording electrode and said opposed electrode to sputter the ink electrostatically from the fore end of said recording electrode toward said recording medium;

means for changing the voltage for said recording electrode from a first voltage to a second voltage according to a recording signal corresponding to a printing signal, and for changing the voltage for said opposed electrode from a third voltage to a fourth voltage while a signal is reverse-biased for the second voltage.

11. The ink dot printer as defined in claim 10, wherein said first voltage is ground.

12. The ink dot printer as defined in claim 10, wherein said third voltage is ground.

13. The dot printer as defined in claim 10, wherein said first and third voltages are ground.

14. The ink dot printer as defined in claim 10, wherein said first voltage is not ground.

15. The ink dot printer as defined in claim 10, wherein said third voltage is not ground.

16. The dot printer as defined in claim 10, wherein said first and third voltages are not ground.

* * * * *